(12) United States Patent
Chang

(10) Patent No.: US 6,929,338 B2
(45) Date of Patent: Aug. 16, 2005

(54) COMPUTER CASE

(75) Inventor: Lin-Wei Chang, Taipei (TW)

(73) Assignee: Inventec Corp., Taipei (TW)

( * ) Notice: Subject to any disclaimer, the term of this patent is extended or adjusted under 35 U.S.C. 154(b) by 37 days.

(21) Appl. No.: 10/656,294

(22) Filed: Sep. 8, 2003

(65) Prior Publication Data
US 2005/0052828 A1 Mar. 10, 2005

(51) Int. Cl.⁷ .............................................. A47B 97/00
(52) U.S. Cl. ................................................ 312/223.2
(58) Field of Search .......................... 312/223.1, 223.2, 312/257.1, 265.6; 361/683, 724; 292/194, 198, 203, DIG. 31

(56) References Cited

U.S. PATENT DOCUMENTS 5,751,545 A * 5/1998 Jung ........................... 361/683
6,398,325 B1 * 6/2002 Chen et al. ............... 312/223.2
6,711,009 B2 * 3/2004 Lee et al. ................... 361/683
6,775,144 B2 * 8/2004 Gan et al. ................... 361/727

FOREIGN PATENT DOCUMENTS

DE 4226951 * 3/1994

* cited by examiner

Primary Examiner—James O. Hansen
(74) Attorney, Agent, or Firm—Bacon & Thomas, PLLC

(57) ABSTRACT

The present invention relates to a computer case comprising a body shell and a cover shell adapted to cover an opening of said body shell, wherein, while said cover shell being put on said body shell, at least one stop member located on an inner wall of said cover shell adapted to stop against a stop member of each at least one springy retaining device of said body shell and to prohibit backward displacement of said cover shell relative to said body shell after engagement between a plurality of engagement devices of said cover shell and the corresponding engagement devices of said body shell.

8 Claims, 5 Drawing Sheets

COMPUTER CASE

BACKGROUND OF THE INVENTION

1. Field of the Invention

The present invention relates to a computer case and, more particularly, to a detachable computer case that can easily be opened without the use of any tools.

2. Description of the Related Art

The case of a personal computer is generally comprised of a body shell and a cover shell covering the body shell. The cover shell is fastened to the body shell with screws. When opening the cover shell for changing the internal component parts, the user needs to remove the screws from the cover shell and the body shell at first. Therefore, it is inconvenient to open the cover shell.

In order to eliminate the aforesaid problem, an easy-to-open computer case is disclosed. As illustrated in FIGS. 1 and 2, the easy-to-open computer case comprises a body shell 5, and a cover shell 6 covering the body shell 5. The body shell 5 has an opening 50 in one side, a plurality of protruding rods 51 and one stop block 52 at each of the two opposite lateral sides of the opening 50, and a plurality of notches 53 respectively disposed between each two adjacent protruding rods 51. The cover shell 6 comprises a plurality of open loop-like receiving elements 61 symmetrically disposed at two opposite lateral sides, and two stop devices 62 disposed at the two opposite lateral sides. Each stop device 62 has one end extended out of the cover shell 6 and terminating in a press portion 621, and the other end suspended inside the cover shell 6 and mounted with a spring plate 622. The spring plate 622 has a free end terminating in a stop block 623.

When covered the cover shell 6 on the opening 50 of the body shell 5, as shown in FIG. 1, the open loop-like receiving elements 61 are respectively suspended in the notches 53, and the stop blocks 623 of the spring plates 622 are respectively disposed at one side relative to the stop blocks 52. Thereafter, the user can press the press portions 621 of the stop devices 62 to move the spring plates 622 of the stop devices 62, causing the spring plates 622 to curve in direction away from the cover shell 6, and therefore the stop blocks 623 are moved away from the cover shell 6. When moving the cover shell 6 horizontally at this time, as shown in FIG. 2, the stop blocks 623 are forced to pass from one side of the stop blocks 52 to the other side below the elevation of the stop blocks 52, thereby causing the protruding rods 51 to be forced into engagement with the open loop-like receiving elements 61 respectively. When released the hands from the press portions 621 of the stop devices 62, the stop blocks 623 are returned to their former position by the spring power of the spring plates 622. Because the stop blocks 623 are returned to their former position, pushing the cover shell 6 horizontally in the reversed direction at this time causes the stop blocks 623 to be respectively stopped against the stop blocks 52, preventing removal of the cover shell 6 from the body shell 5.

The aforesaid design of computer case eliminates the inconveniences caused due to the use of tie screws. However, when locking the cover shell 6 to the body shell 5, the user must press the press portions 621 with the thumbs of the two hands, i.e. the user cannot lock the cover shell 6 to the body shell 5 with one single hand. On the contrary, when removing the cover shell 6 from the body shell 5, the user must keep pressing the press portions 621 with the thumbs of the two hands, and then use the other fingers to push the cover shell 6 horizontally in the reversed direction, and then remove the cover shell 6 from the body shell 5 after the open loop-like receiving elements 61 had been moved to the notches 53 and the stop blocks 623 of the spring plates 622 had been respectively moved below the stop blocks 52 to the other side. Because there is a certain friction resistance between the protruding rods 51 and the open loop-like receiving elements 61, the user must employ much force to the push the cover shell 6 horizontally in the reversed direction to force the open loop-like receiving elements 61 away from the protruding rods 51. This operation procedure requires much effort.

Therefore, it is desirable to provide a detachable computer case that enables the cover shell 6 to be conveniently and quickly locked to the body shell 5, and then rapidly unlocked and removed from the body shell 5 when desired. Thus, the supplier can accelerate the assembly time and improve the productivity. To consumers, this design of computer case enables the user to replace or expand the internal electronic components conveniently.

SUMMARY OF THE INVENTION

The present invention has been accomplished under the circumstances in view. It is one object of the present invention to provide a computer case, which enables the user to unlock the cover shell and then remove the cover shell from the body shell conveniently without the use of any tools.

To achieve this and other objects of the present invention, the computer case comprises a body shell, said body shell comprising an opening in one side thereof, a plurality of engagement devices symmetrically disposed at two sides of said opening, and at least one springy retaining device located on an inside wall facing said opening, said at least one springy retaining device each comprising a stop member and a baffle; and a cover shell adapted to cover the opening of said body shell, said cover shell comprising a plurality of engagement devices symmetrically disposed at two sides and adapted to engage the engagement devices at said body shell upon a horizontal displacement of said cover shell relative to said body shell after said cover shell have been put on said body shell, at least one stop member located on an inner wall thereof adapted to stop against the stop member of each said at least one springy retaining device of said body shell and to prohibit backward displacement of said cover shell relative to said body shell after engagement between the engagement devices of said cover shell and the engagement devices of said body shell, and at least one swivel arm respectively pivoted to the inner wall of said cover shell, each said swivel arm having one end extended out of said cover shell and terminating in a finger strip for pulling by the user and an opposite end suspended inside said cover shell and terminating in a pressure tip adapted to force the stop member of the corresponding springy retaining device of said body shell away from the corresponding stop member of said cover shell and to further cause the engagement devices of said cover shell to be respectively disengaged from the engagement devices of said body shell upon turning of said swivel arm by the user.

DETAILED DESCRIPTION OF THE PREFERRED EMBODIMENT

Figure 1:
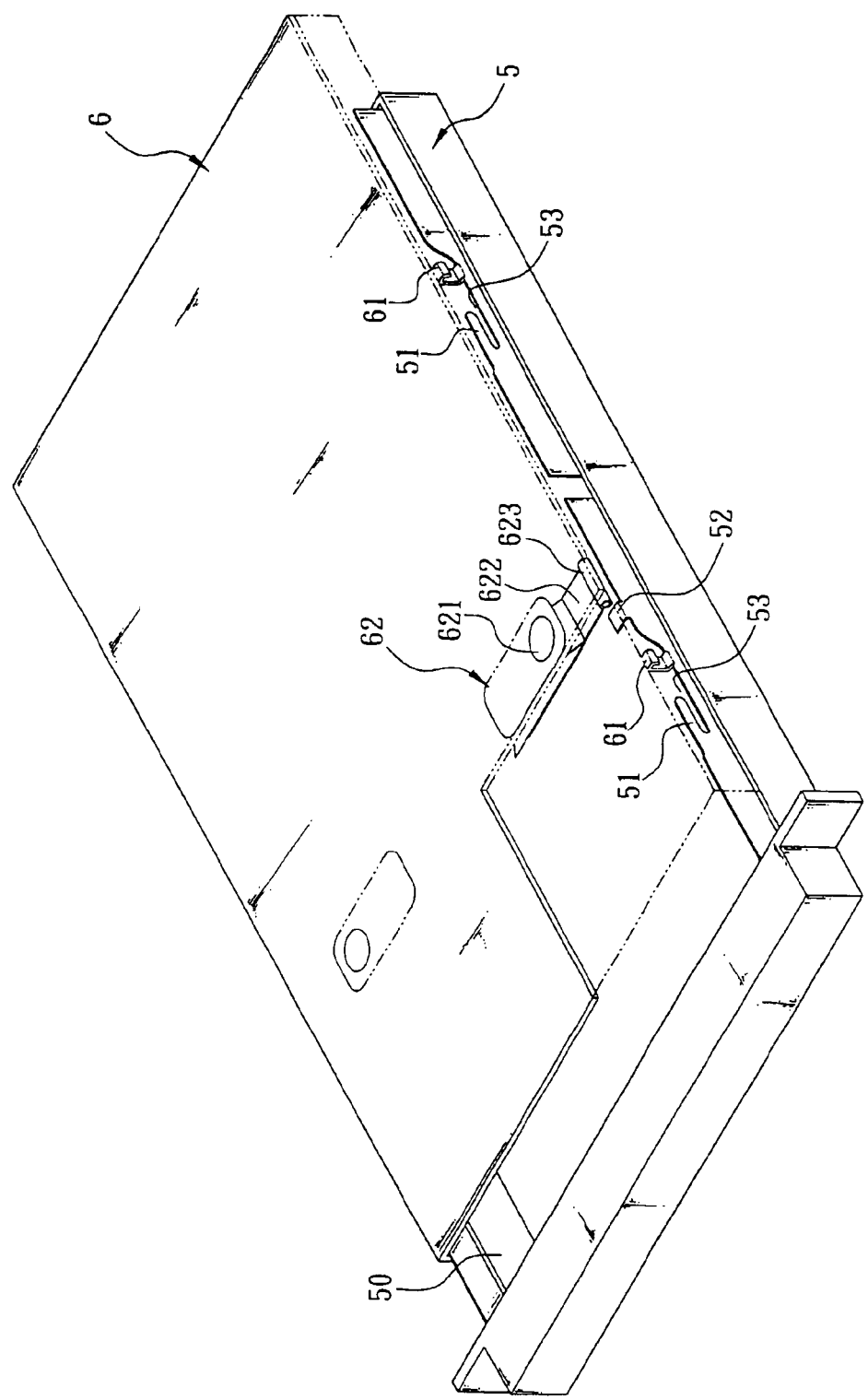
FIG. 1 is a perspective view of a computer case according to the prior art when unlocked.
Figure 2:
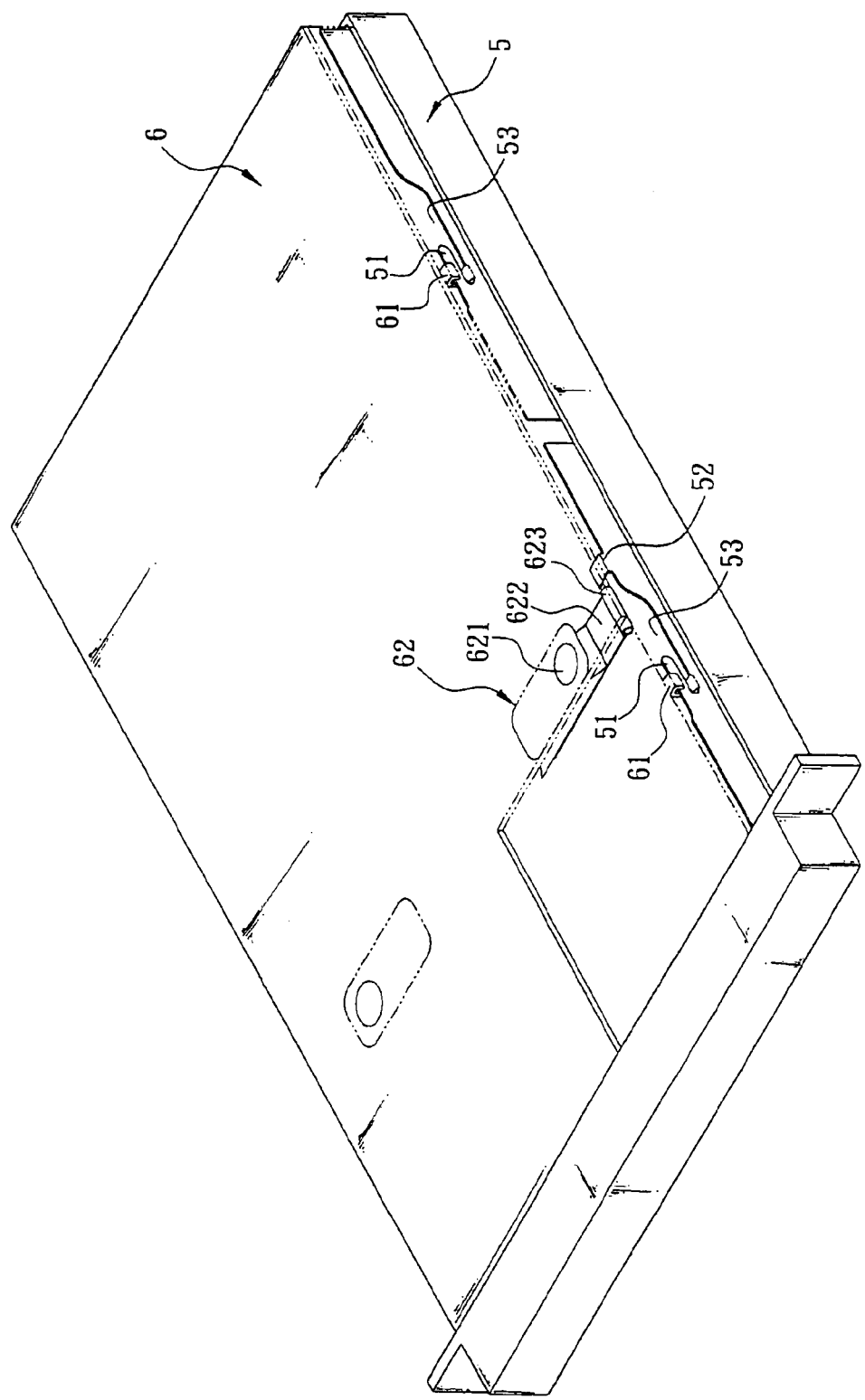
FIG. 2 is a perspective view of the prior art computer case when locked.
Figure 3:
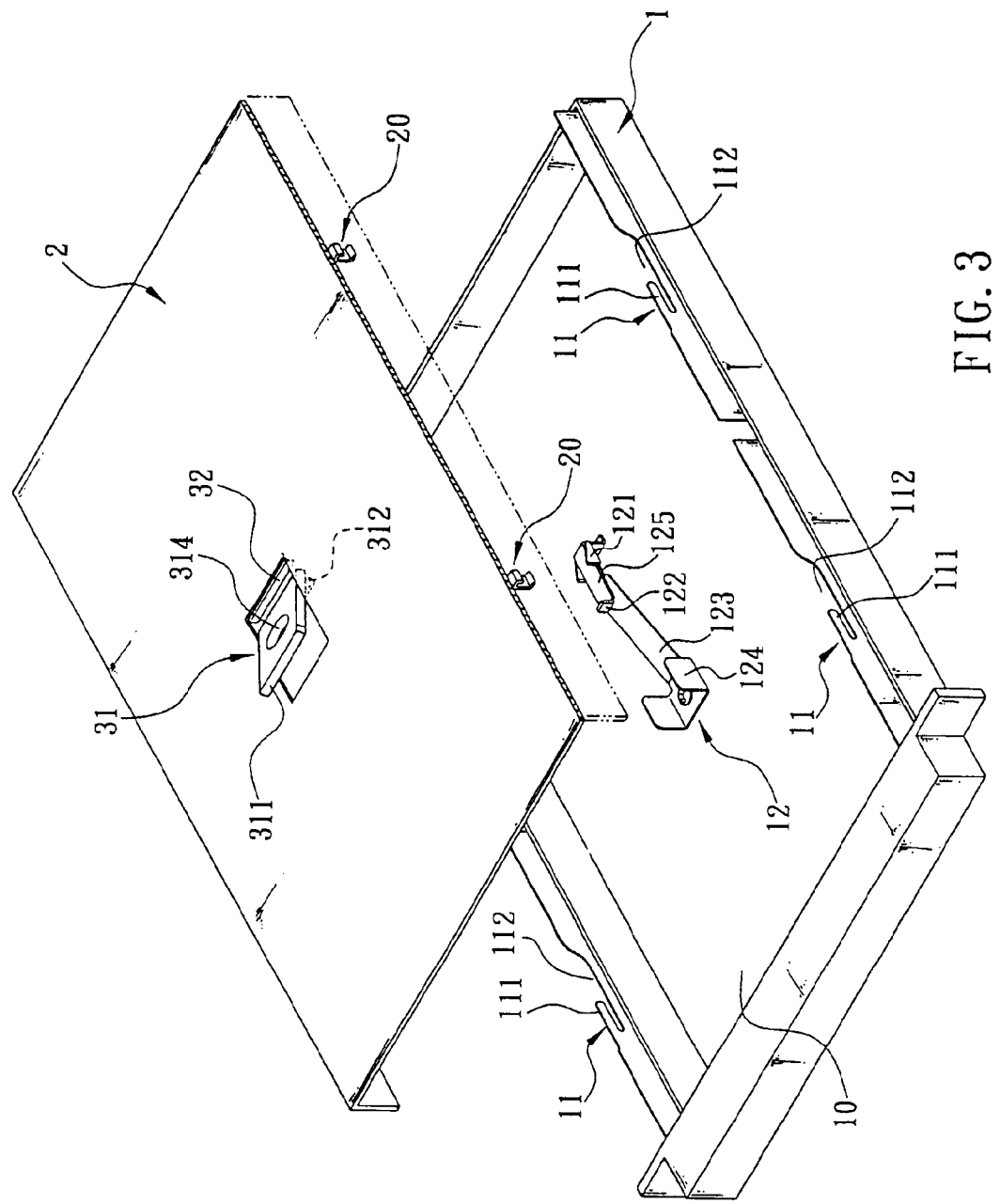
FIG. 3 is an exploded view of a computer case according to the present invention.
Figure 4:
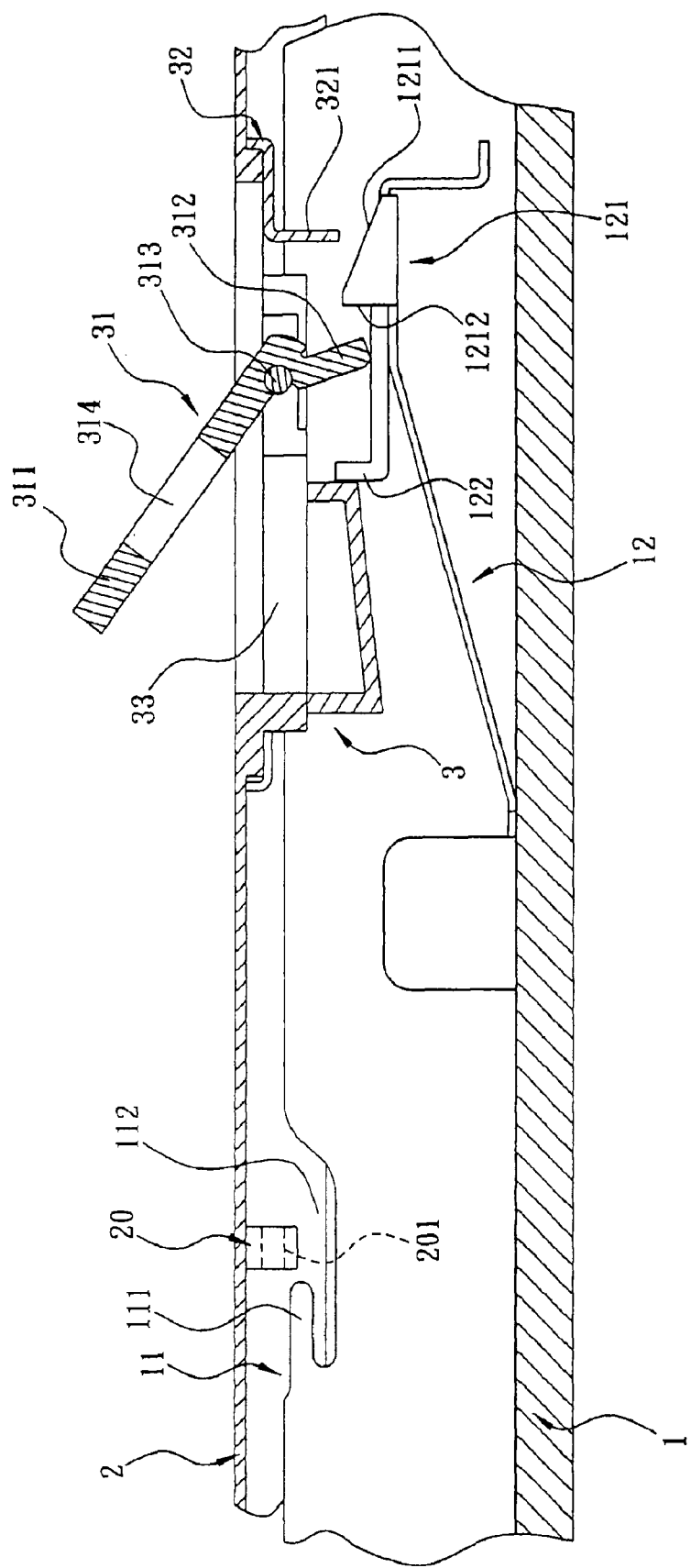
FIG. 4 is a schematic sectional view showing the mounting procedure of the computer case according to the present invention (I).

Referring to FIGS. 3 and 4, a computer case in accordance with the present invention is shown comprised of a body shell 1 and a cover shell 2 covering the body shell 1. The body shell 1 has an opening 10 in one side, a plurality of engagement devices 11 symmetrically disposed at two sides of the opening 10, and at least one, for example, one springy retaining device 12 located on the inside wall facing the opening 10. The springy retaining device 12 comprises a stop member 121 and a baffle 122. The cover shell 2 comprises a plurality of engagement devices 20 symmetrically disposed at two sides corresponding to the engagement devices 11 at the body shell 1, at least one, for example, one stop member 32 located on the inner wall, and a swivel arm 31 pivoted to the inner wall adjacent to the stop member 32. The swivel arm 31 has one end extended out of the top side of the cover shell 2 and terminating in a finger strip 311 and the other end suspended inside the cover shell 2 and terminating in a pressure tip 312 (see FIG. 4). During assembly process, the cover shell 2 is covered on the body shell 1 to aim the engagement devices 20 at the engagement devices 11 respectively, and then push the cover shell 2 forwards to force the springy retaining device 12 downwards and to move the stop member 32 over the stop member 121, thereby causing the engagement devices 20 to be respectively forced into engagement with the engagement device 11. Upon engagement of the engagement devices 20 with the engagement devices 11, the stop member 121 is returned to its former position due to the effect of the spring power of the springy retaining device 12, and therefore the stop member 121 stops the stop member 32 from backward movement, i.e., the cover shell 2 is locked to the body shell 1.

In short, as shown in FIGS. 3 and 4, the engagement between the stop member 32 of the cover shell 2 and the stop member 121 of the body shell 1 prohibits horizontal displacement of the cover shell 2 relative to the body shell 1, and the engagement between the engagement devices 20 of the cover shell 2 and the engagement devices 11 of the body shell 1 prohibits vertical movement of the cover shell 2 relative to the body shell 1, and therefore, the cover shell 2 is positively locked to the body shell 1.

On the contrary, as shown in FIGS. 3 and 4, when imparting a pulling force to the finger strip 311 in direction away from the body shell 1, the swivel arm 31 is turned in one direction about an axis passing through the pivoted point between the swivel arm 31 and the cover shell 2, the pressure tip 312 is moved to the springy retaining device 12 to push the springy retaining device 12 toward the inside of the body shell 1 and to further disengage the stop member 121 from the stop member 32. Continuously turning the finger strip 311 in direction away from the body shell 1 causes the pressure tip 312 to stop against the baffle 122 and to further produce a reaction force, which forces the cover shell 2 to move relative to the body shell 1 and simultaneously forces the engagement devices 20 away from the engagement devices 11. At this time, the user can move the cover shell 2 horizontally relative to the body shell 1 in the reversed direction to completely disengage the engagement devices 20 from the engagement devices 11, thus the cover shell 2 can easily be removed from the body shell 1.

Figure 5:
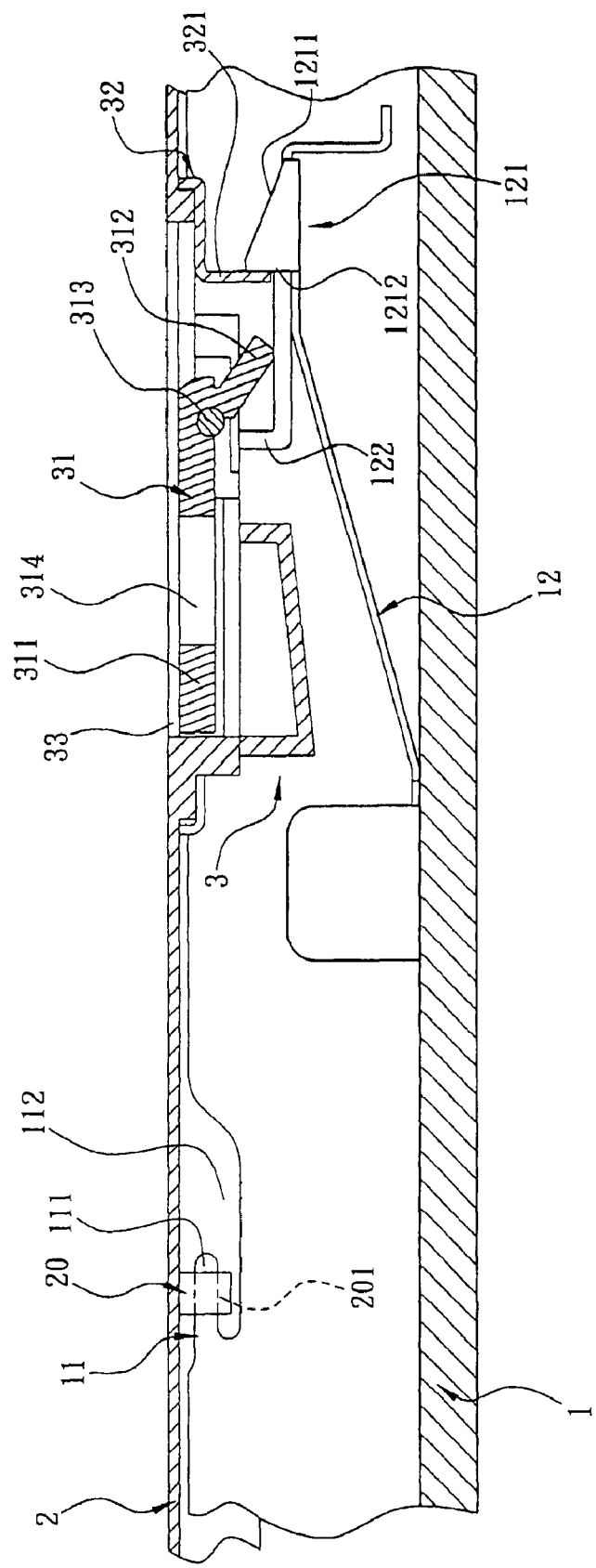
FIG. 5 is a schematic sectional view showing the mounting procedure of the computer case according to the present invention (II).

Referring to FIGS. 3~5, the engagement devices 11 of the body shell 1 each are comprised of a notch 112 and an elongated engagement element 111 suspending above the notch 112 at one side. The engagement devices 20 of the cover shell 2 each are comprised of a receiving element 201 shaped like an open loop. When put the cover shell 2 on the body shell 1, the receiving elements 201 of the engagement devices 20 of the cover shell 2 are respectively suspended in the notches 112 of the engagement devices 11 of the body shell 1. At this time, the user can push the cover shell 2 forwards relative to the body shell 1 to force the open loop-like receiving elements 201 of the engagement devices 20 into engagement with the elongated engagement element 111 to stop the cover shell 2 from vertical movement relative to the body shell 1.

Referring to FIGS. 3~5 again, in order to let the cover shell 2 be easily and quickly locked to the body shell 1, the stop member 121 is made shaped like a right-angled triangular block having a sloping top wall 1211 and a vertical lateral wall 1212. The stop member 32 is a plate member 321 protruded from the inner wall of the cover shell 2. When pushing the cover shell 2 horizontally forwards on the body shell 1 to the locking position, the plate member 321 will be moved over the sloping top wall 1211 of the stop member 121 to force the springy retaining device 12 downwards. When continuously moving the cover shell 2 forwards, the plate member 321 will be moved to the front side of the vertical lateral wall 1212. At this time, the springy power of the springy retaining device 12 moves the stop member 121 back to its former position, and therefore the vertical lateral wall 1212 is stopped against the plate member 321, preventing backward displacement of the cover shell 2 relative to the body shell 1. At the same time, the loop-like receiving elements 201 of the engagement devices 20 are respectively forced into engagement with the elongated engagement element 111 to stop the cover shell 2 from vertical movement relative to the body shell 1. Therefore, the cover shell 2 is locked to the body shell 1.

Referring to FIGS. 3~5 again, if the swivel arm 31 is directly pivoted to the cover shell 2, the fabrication procedure will be complicated and, the repair work of the swivel arm will be difficult. Therefore, a pivot holder 3 is fixedly provided at the cover shell 2 for receiving the swivel arm 31, and a pivot pin 313 is installed to pivotally secure the swivel arm 31 to the pivot holder 3. The stop member 32 protrudes from the inner wall of the cover shell 2 and is spaced from the swivel arm 31 at a distance. The pivot holder 3 has a recessed receiving chamber 33 adapted to receive the finer strip 311 when the swivel arm 31 is turned to a horizontal position in flush with the outer wall of the cover shell 2. Further, the finger strip 311 has a finger hole 314 (see FIG. 3). The user can insert one finger into the finger hole 314 to move the finger strip 311.

Referring to FIG. 3 again, the springy retaining device 12 further comprises a support arm 123. The support arm 123 has a fixed end 124 fixedly fastened to the body shell 1, and a free end terminating in an actuating device 125 into which the stop member 121 and the baffle 122 are incorporated.

A prototype of computer case has been constructed with the features of FIGS. 3~5. The computer case functions smoothly to provide all of the features discussed earlier.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A computer case comprising:

a body shell, said body shell comprising an opening in one side thereof, a plurality of engagement devices symmetrically disposed at two sides of said opening, and at least one springy retaining device located on an inside wall facing said opening, said at least one springy retaining device comprising a stop member and a baffle;

a cover shell adapted to cover the opening of said body shell, said cover shell comprising a plurality of engagement devices symmetrically disposed at two sides and adapted to engage the engagement devices of said body shell upon a horizontal displacement of said cover shell relative to said body shell after said cover shell has been put on said body shell, at least one stop member located on an inner wall thereof adapted to stop against the stop member of said at least one springy retaining device of said body shell and to prohibit backward displacement of said cover shell relative to said body shell after engagement between the engagement devices of said cover shell and the engagement devices of said body shell, and at least one swivel arm pivoted to the inner wall of said cover shell, said swivel arm having one end extended out of said cover shell and terminating in a finger strip for pulling by a user and an opposite end suspended inside said cover shell and terminating in a pressure tip adapted to force the stop member of the springy retaining device of said body shell away from the stop member of said cover shell and to further cause the engagement devices of said cover shell to be respectively disengaged from the engagement devices of said body shell upon turning of said swivel arm by the user.

2. The computer case as claimed in claim 1, wherein the engagement devices of said body shell each comprise a notch and an elongated engagement element suspended above said notch at one side; and the engagement devices of said cover shell each comprise a receiving element shaped like an open loop and adapted to accommodate the elongated engagement element of one engagement device of said body shell.

3. The computer case as claimed in claim 1, wherein the stop member of said springy retaining device of said body shell is formed of a right-angled triangular block having a sloping top wall and a vertical lateral wall; the at least one stop member of said cover shell is comprised of a plate member that protrudes from the inner wall of said cover shell.

4. The computer case as claimed in claim 1, wherein said cover shell further comprises at least one pivot holder; and said at least one swivel arm is puivotally secured to the at least one pivot holder by a pivot means.

5. The computer case as claimed in claim 4, wherein the at least one stop member of said cover shell protrudes from the inner wall of said cover shell and is spaced from said at least one swivel arm at a distance.

6. The computer case as claimed in claim 4, wherein said at least one pivot holder has a recessed receiving chamber adapted to receive the finger strip of the swivel arm.

7. The computer case as claimed in claim 4, wherein the finger strip of said at least one swivel arm has a finger hole.

8. The computer case as claimed in claim 1, wherein said at least one springy retaining device further comprises a support arm, said support arm having a fixed end fixedly fastened to said body shell, and a free end terminating in an actuating device; and the stop member and baffle of said springy retaining device are incorporated into the actuating device of the support arm of at least one springy retaining device.

* * * * *